US007306280B1

(12) United States Patent
Kraimer

(10) Patent No.: US 7,306,280 B1
(45) Date of Patent: Dec. 11, 2007

(54) OVERHEAD GUARD FOR MATERIALS HANDLING VEHICLE

(75) Inventor: James V. Kraimer, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 11/478,388

(22) Filed: Jun. 29, 2006

(51) Int. Cl.
*B62D 25/06* (2006.01)
*B62D 49/02* (2006.01)
*B60R 21/13* (2006.01)
*B62D 33/04* (2006.01)

(52) U.S. Cl. .......................... 296/190.03; 296/107.03; 280/756

(58) Field of Classification Search ................ 296/102, 296/107.03, 190.01, 190.03; 187/222; 280/756
See application file for complete search history.

(56) References Cited

U.S. PATENT DOCUMENTS

| | | | | | |
|---|---|---|---|---|---|
| 81,227 | A | * | 8/1868 | Titcomb | 296/102 |
| 869,061 | A | * | 10/1907 | Cox | 135/88.02 |
| 1,359,686 | A | * | 11/1920 | Fuller | 296/102 |
| 2,263,978 | A | * | 11/1941 | Roy et al. | 414/634 |
| 2,263,981 | A | * | 11/1941 | Dalecke et al. | 414/634 |
| 2,349,352 | A | * | 5/1944 | Johnson | 414/635 |
| 2,728,474 | A | * | 12/1955 | Bernhard | 414/469 |
| 2,820,561 | A | * | 1/1958 | Meagher | 414/607 |
| 2,911,232 | A | | 11/1959 | Hastings, Jr. et al. | |
| 3,289,871 | A | | 12/1966 | Tourneau et al. | |
| 3,336,074 | A | | 8/1967 | Barnes et al. | |
| 3,472,550 | A | | 10/1969 | Marco | |
| 3,502,368 | A | | 3/1970 | Maxa | |
| 3,520,571 | A | | 7/1970 | Rogers | |
| 3,679,256 | A | | 7/1972 | Orns | |
| 3,687,484 | A | | 8/1972 | Cosby | |
| 3,713,688 | A | | 1/1973 | Monroe | |
| 3,829,121 | A | | 8/1974 | Ahrendt | |
| 3,841,698 | A | | 10/1974 | Stammen | |
| 3,844,382 | A | | 10/1974 | Mecklenburg | |
| 3,933,371 | A | | 1/1976 | Graham | |
| 3,934,679 | A | | 1/1976 | Lieptz | |
| 3,941,213 | A | | 3/1976 | Stammen | |
| 3,995,891 | A | | 12/1976 | Hoyt | |
| 4,026,597 | A | | 5/1977 | Miller et al. | |
| 4,032,187 | A | * | 6/1977 | Atherton | 296/102 |
| 4,035,096 | A | | 7/1977 | Miller | |

(Continued)

FOREIGN PATENT DOCUMENTS

| | | | | | |
|---|---|---|---|---|---|
| JP | 58221775 | A | * | 12/1983 | 180/89.12 |

(Continued)

*Primary Examiner*—D. Glenn Dayoan
*Assistant Examiner*—Paul Chenevert
(74) *Attorney, Agent, or Firm*—Stevens & Showalter LLP

(57) ABSTRACT

An overhead guard comprises a guard frame and a plurality of guard members. The guard frame is coupled to a suitable support structure of a materials handling vehicle so as to extend generally over at least a portion of an operator's compartment of the vehicle. The guard frame is oriented at an angle having a magnitude that is at least five degrees relative to the horizontal, and is angled upward towards a load handling assembly of the vehicle, at least in an area of the guard situated between a normal vehicle operating position and the load handling assembly. The plurality of guard members are supported by the guard frame at least within an area generally over the operator's compartment of the vehicle.

20 Claims, 8 Drawing Sheets

U.S. PATENT DOCUMENTS

| | | | | |
|---|---|---|---|---|
| 4,043,472 A | | 8/1977 | Hoyt | |
| 4,047,750 A | | 9/1977 | Samide | |
| 4,120,528 A | | 10/1978 | Samide | |
| 4,202,565 A | | 5/1980 | Mosch | |
| 4,205,874 A | | 6/1980 | Martin | |
| 4,207,967 A | | 6/1980 | Stedman | |
| 4,266,808 A | | 5/1981 | Fassett | |
| 4,411,464 A | | 10/1983 | Bauer | |
| 4,585,268 A | | 4/1986 | Downing | |
| 4,919,233 A | | 4/1990 | Larsen et al. | |
| 5,011,358 A | * | 4/1991 | Andersen et al. | 414/273 |
| 5,071,187 A | | 12/1991 | Smith et al. | |
| 5,167,481 A | | 12/1992 | Gotz | |
| 5,326,148 A | | 7/1994 | Kojima et al. | |
| 5,501,297 A | | 3/1996 | Josephs | |
| 5,738,187 A | * | 4/1998 | Dammeyer et al. | 187/222 |
| 5,890,562 A | * | 4/1999 | Bartels et al. | 187/224 |
| 6,182,797 B1 | * | 2/2001 | Tebbe et al. | 187/227 |
| 6,220,656 B1 | | 4/2001 | Martin, Jr. | |
| 6,276,750 B1 | * | 8/2001 | Frisch | 296/190.1 |
| 2004/0124037 A1 | * | 7/2004 | Ruck | 187/222 |
| 2005/0168007 A1 | * | 8/2005 | Westendorf et al. | 296/102 |

FOREIGN PATENT DOCUMENTS

| | | | | |
|---|---|---|---|---|
| JP | 58221776 A | * | 12/1983 | 180/89.12 |
| JP | 08324991 A | * | 12/1996 | |

* cited by examiner

FIG. 7
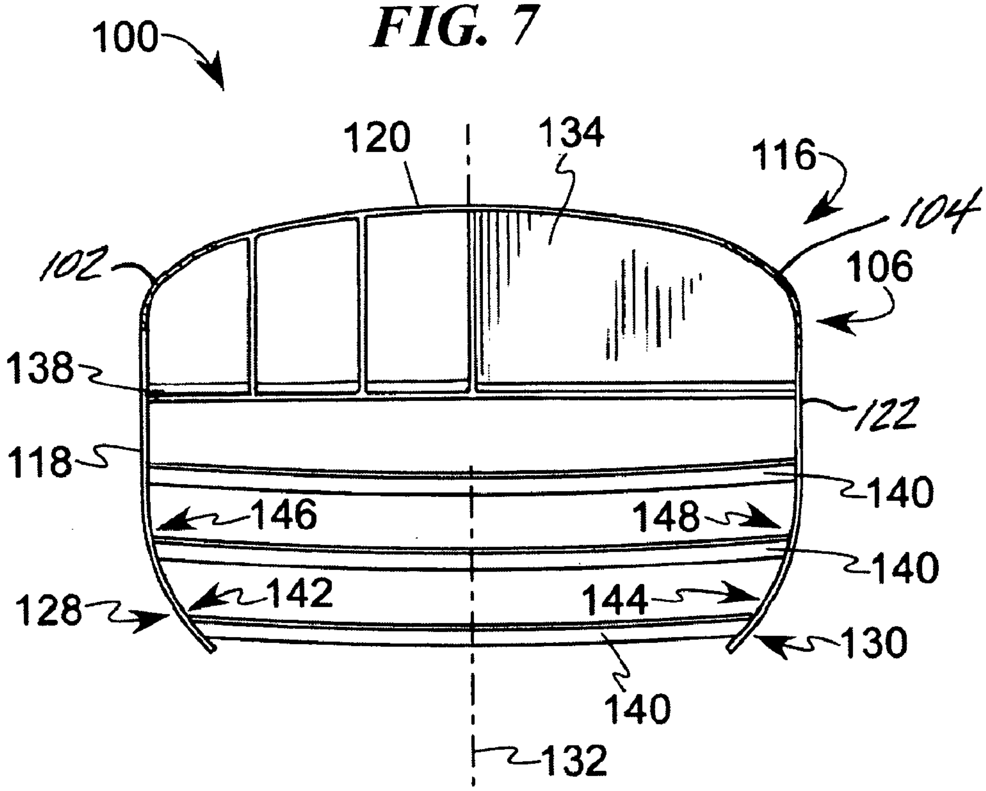
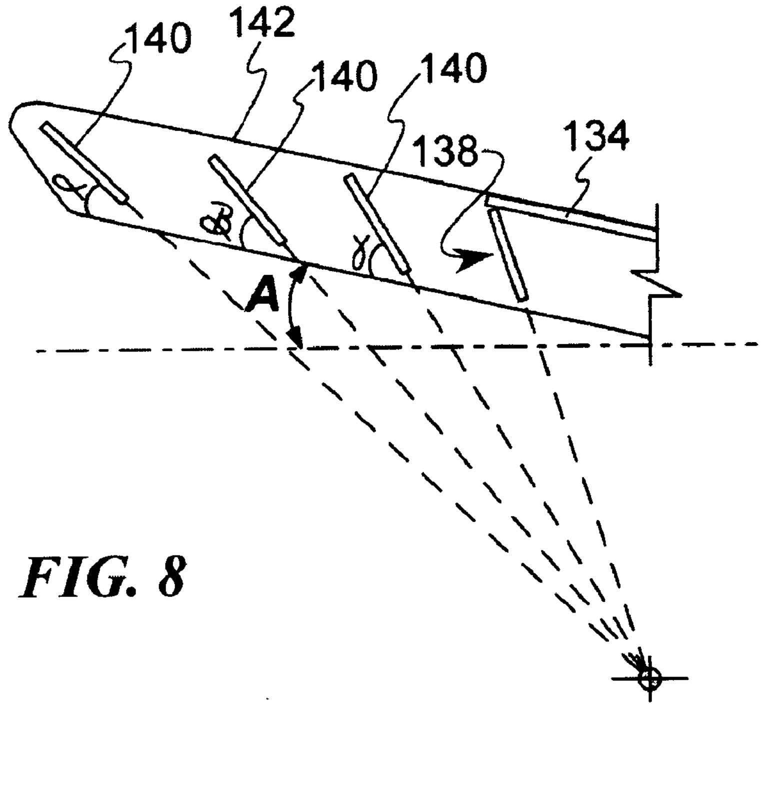
FIG. 8

OVERHEAD GUARD FOR MATERIALS HANDLING VEHICLE

BACKGROUND OF THE INVENTION

The present invention relates in general to materials handling vehicles, and more particularly to overhead guards for materials handling vehicles.

Vehicle operator overhead guards are common devices found on a wide variety of material handling vehicles such as fork lift trucks. The overhead guard provides a barrier between the vehicle operator and objects that may free fall from positions located above the operator. Such falling objects may result for example, from unstable objects in a rack, bin, stack or other location in the work area proximate to and above the vehicle operator.

In a typical warehouse or distribution center, palletized stock items are stored in bins, racks or other storage structures that are aligned to each side of generally long, parallel extending aisles. To maximize available space, it is not uncommon for several storage structures to be vertically stacked, such that stock may be stored at heights up to 7 meters or more. Accordingly, an operator of a materials handling vehicle that is retrieving and/or putting away stock may be required to look upward from an operating position of the vehicle towards the mast to properly identify the proper height of the forks for stock to be retrieved or put away. However, a conventional overhead guard is spaced horizontally over the operator and extends towards the mast to provide a barrier between falling objects and the operator. The conventional overhead guard thus invariably limits the visibility of the operator when trying to view the raised forks of the vehicle.

SUMMARY OF THE INVENTION

According to a first aspect of the present invention, an overhead guard for a materials handling vehicle comprises a guard frame and at least one guard member supported by the guard frame. The guard frame is coupled to a support structure, such as one or more support posts extending from a vehicle chassis or from a mast of the vehicle, so as to extend generally over at least a portion of an operator's compartment of the vehicle. Moreover, the guard frame is oriented at an angle at least in an area of the overhead guard situated forward of a normal vehicle operating position towards a load handling assembly of the vehicle, where the angle has a magnitude that is at least five degrees relative to horizontal directed upward towards the load handling assembly.

The guard frame may comprise, for example, first and second longitudinal frame members coupled together by at least one lateral frame member. At least one guard member, such as a bar, spans or otherwise extends in an area between the first and second longitudinal frame members. Each bar is oriented at an angle relative to the first and second longitudinal frame members so as to improve visibility through the overhead guard from a vantage point corresponding to a normal vehicle operating position. In addition to, or in lieu of bars, the guard member(s) may also be defined by a plate or other suitable structure capable of providing a barrier across or otherwise between the frame members. The plate may incorporate or otherwise be provided in addition to slots or other openings that allow visibility through the overhead guard.

According to another aspect of the present invention, a materials handling vehicle comprises an operator's compartment, a load handling assembly and an overhead guard. The operator's compartment has a first lateral sidewall, a first longitudinal sidewall and a second longitudinal sidewall. The load handling assembly is positioned adjacent to the first lateral side wall of the operator's compartment, and may include, for example, a mast and a pair of forks controllable to traverse up and down along at least a portion of the mast.

The overhead guard comprises a guard frame and at least one guard member. The guard frame is coupled to a suitable support structure so as to extend generally over at least a portion of the operator's compartment of the vehicle. For example, the guard frame may couple to a vehicle chassis by one or more support posts. In this configuration, each support post may extend from any suitable support location of the vehicle. In addition to, or in lieu of support posts, the guard frame may couple to the mast or other support member of the vehicle. Moreover, the guard frame is oriented at an angle at least in an area of the overhead guard situated forward of a normal vehicle operating position towards the load handling assembly of the vehicle, the angle having a magnitude that is at least five degrees relative to horizontal directed upward towards the load handling assembly.

According to yet another aspect of the present invention, an overhead guard comprises a guard frame having first and second longitudinal frame members and at least one lateral frame member that couples the first and second longitudinal frame members. The overhead guard is coupled to a support structure of a materials handling vehicle so as to extend generally over at least a portion of an operator's compartment of the vehicle such that the first and second longitudinal frame members are oriented at an angle at least in an area of the overhead guard situated forward of a normal vehicle operating position towards a load handling assembly of the vehicle, where the angle has a magnitude that is at least five degrees relative to horizontal directed upward towards the load handling assembly. The overhead guard further comprises a plurality of guard bars that span between the first and second longitudinal frame members, wherein a distance between each of the guard members is selected based upon the angle of the first and second frame members so that a horizontal distance between adjacent guard members does not exceed a predetermined distance, e.g., six inches.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which:

FIG. 7 is a bottom view looking upward towards the overhead guard illustrated in FIG. 6;

FIG. 8 is a schematic representation of a cross sectional view of a section of the overhead guard illustrated in FIG. 1 along with an exemplary line of sight reference indication;

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
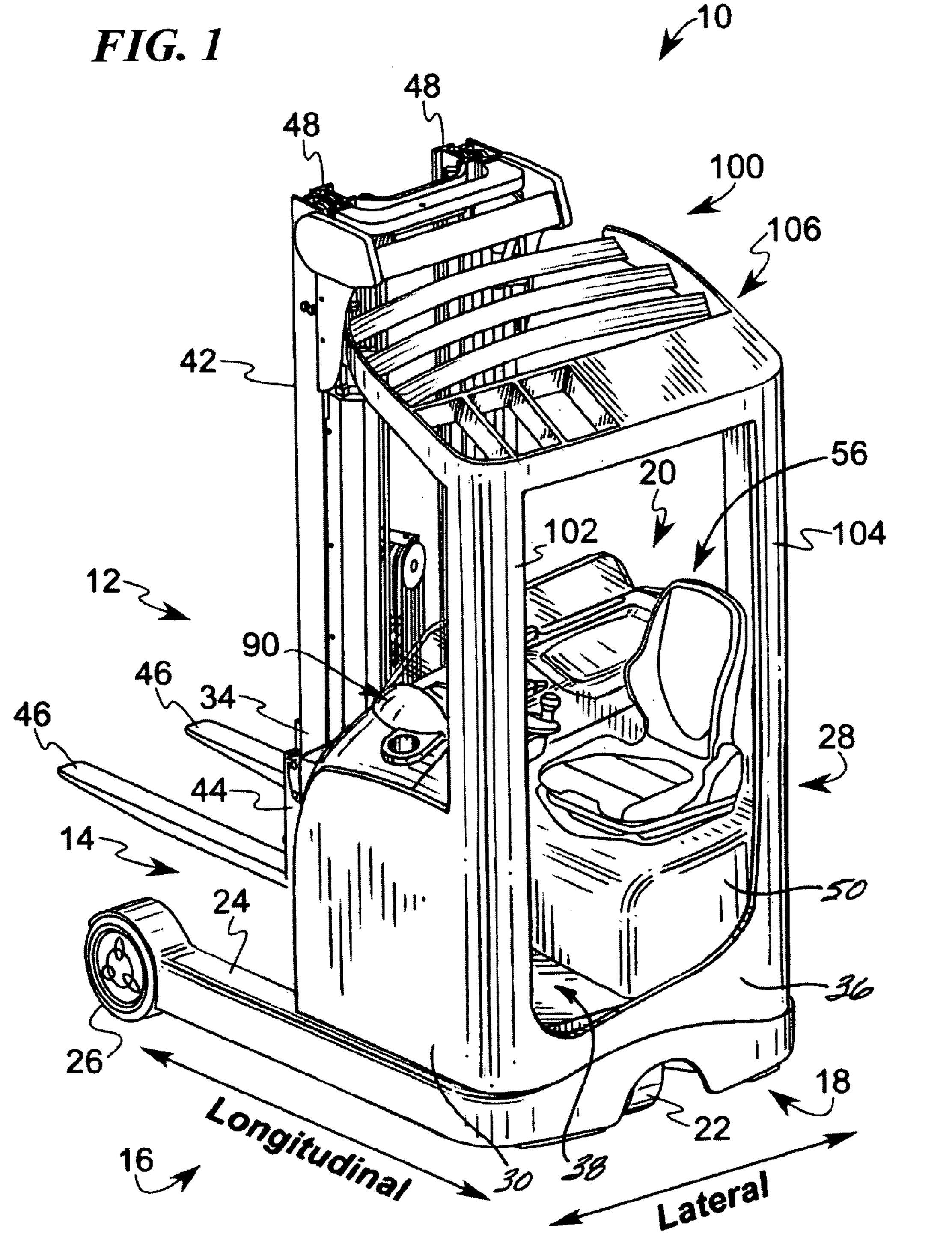
FIG. 1 is a perspective view of an exemplary materials handling vehicle having an overhead guard according to a first aspect of the present invention.
Figure 2:
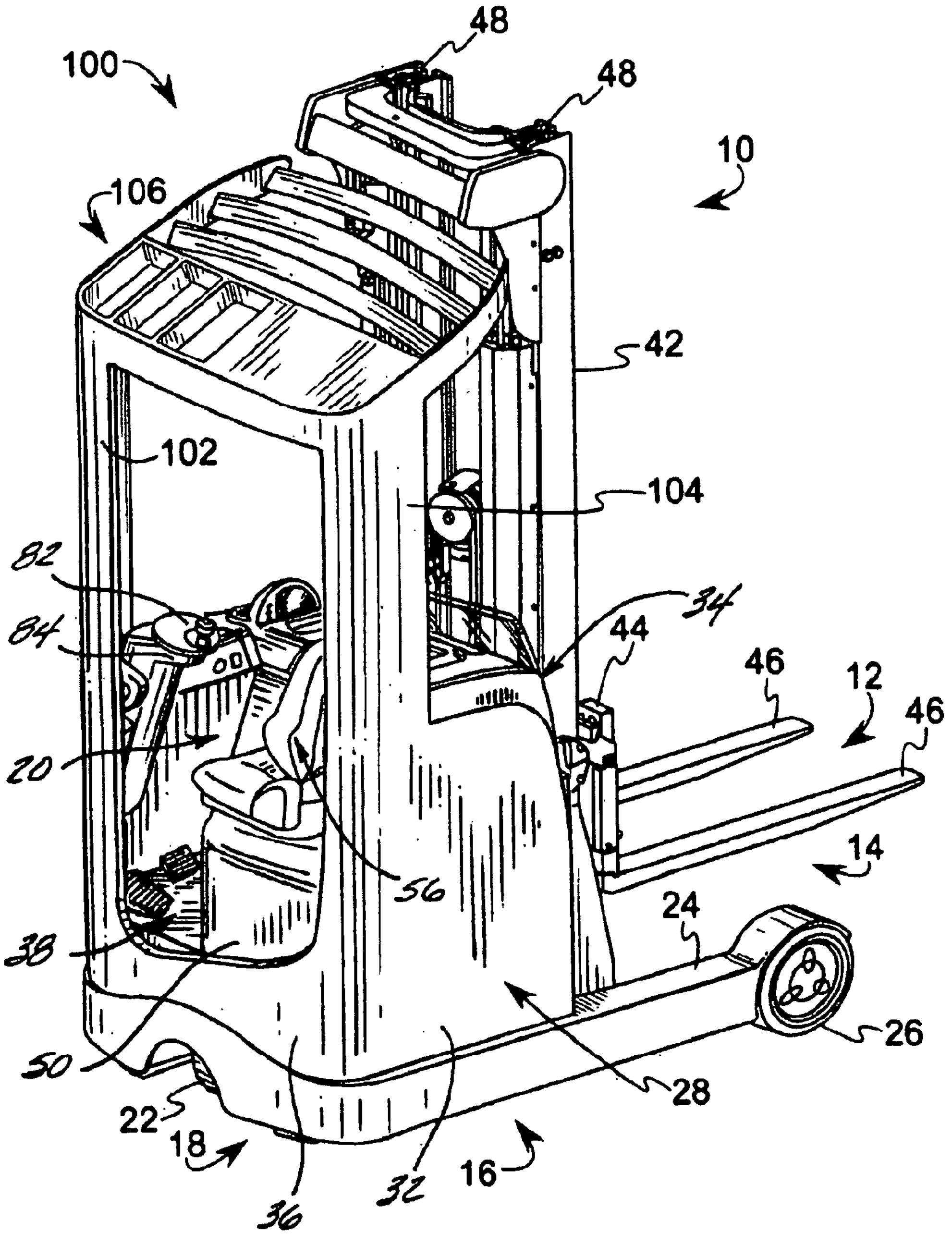
FIG. 2 is another perspective view of the exemplary materials handling vehicle of FIG. 1.

Referring now to the drawings, and particularly to FIGS. 1 and 2, a materials handling vehicle 10, which is illustrated as a rider reach truck, includes a load handling assembly 12 positioned generally towards a first end section 14 of the vehicle 10 and a power unit 16 positioned generally towards a second end section 18 of the vehicle 10. The power unit 16 includes an operator's compartment 20, a steered wheel 22 positioned generally beneath the operator's compartment 20, a pair of outriggers 24 that extend from the power unit 16 in a longitudinal direction towards the first end section 14 of the vehicle 10 so as to flank either side of the load handling assembly 12 and a pair of front wheels 26, one wheel 26 coupled to each outrigger 24.

The operator's compartment 20 is defined by a volume within a chassis 28 that includes generally, a first longitudinal sidewall 30, a second longitudinal sidewall 32, a first lateral sidewall 34 towards the first end section 14 of the vehicle 10 generally adjacent to load handling assembly 12 and a second lateral sidewall 36 towards the second end section 18 of the vehicle 10. As illustrated, the operator's compartment 20 provides substantially open access thereto, e.g., via an opening 38 through the second lateral sidewall 36 of the operator's compartment 20, which allows for unimpeded ingress and egress to the operator's compartment 20.

The load handling assembly 12 includes a mast 42 that extends generally vertical from the power unit 16, a fork carriage mechanism 44 supported by the mast 42 and a pair of forks 46 that are carried by the fork carriage mechanism 44. The illustrated mast 42 includes a pair of mast rails 48 defining an offset, wide view mast assembly, which allows a relatively wide visibility window between the pair of mast rails 48, and allows visibility to both the outriggers 24 and the forks 46. However, depending upon the vehicle 10 and the intended applications, the load handling assembly 12 may be implemented by different mast and fork arrangements or other load handling structures altogether.

The vehicle 10 further comprises a motor compartment 50, which may be located, for example, underneath and/or outside of the operator's compartment 20. The motor compartment 50 houses necessary motors and drive devices (not shown), such as a traction motor provided to drive the steered wheel 22, and one or more hydraulics pump motors, which are provided to power hydraulic functions of the vehicle 10. The various motors and drive devices may alternatively be positioned in separate compartments within or about the power unit 16.

Figure 3:
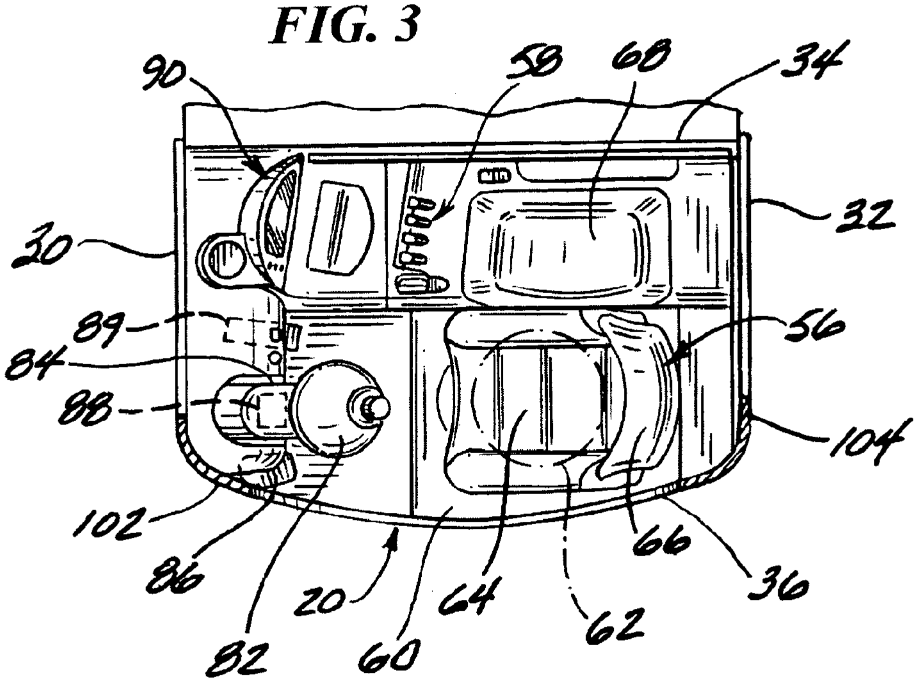
FIG. 3 is a top view of the operator's compartment of the materials handling vehicle of FIG. 1.

With reference to FIG. 3, the operator's compartment 20 defines an operator's area from which an operator may drive the vehicle 10 and control the load handling and other work operative features of the vehicle 10. An operator's station is defined within the operator's compartment, e.g., comprising an operator's seat 56 and a plurality of work operative controls 58 that are provided in close proximity to one another such that the an operator can reach and operate the work operative controls 58 while in a seated position on the operator's seat 56. Thus, a seated operator assumes a normal vehicle operating position at the operator's station and can readily operate the vehicle, e.g., by operating the work operative controls 58 for controlling navigation and/or acceleration of the vehicle 10, operating the work operative implements and features of the vehicle 10, e.g., by controlling the height of the forks 46, the fork extension, fork tilt and/or side-shift, and/or by operating other features related to the vehicle 10 or to the performance of specific tasks associated with the vehicle 10. As illustrated, the operator's seat 56 is set inside the operator's compartment 20 on the right hand side when facing the second lateral sidewall 36 from outside the vehicle 10. Moreover, the operator's seat 56 is spaced along the second longitudinal wall by a predetermined distance from the second lateral sidewall 36, i.e., towards the first lateral sidewall 34.

The illustrated operator's seat 56 includes a base structure 60, an intermediate member 62, a seat bottom 64 and a seat back 66. The base structure 60 may be positioned, for example, above the motor compartment 50, and serves as a mounting structure for the seat bottom 64. The intermediate member 62 allows the seat bottom 64 to be adjusted to an operator set position relative to the base structure 60. For example, the intermediate member 62 may comprise an arrangement that allows the seat bottom 64 to swivel or rotate relative to the base structure 60. The intermediate member 62 may further or alternatively allow the seat bottom 64 to move generally about a limited horizontal plane, e.g., by allowing the seat bottom 64 to transition in the fore, aft and/or lateral directions relative to the base structure 60.

The operator's seat 56 may optionally include other adjustable features such as a seat back tilt arrangement that allows the seat back 66 to tilt relative to the seat bottom 64. In this regard, the seat back tilt arrangement may include an optional tilt release lever for selectively enabling repositioning of the seat back 66. Alternatively, the seat back tilt arrangement may be arranged so as to provide a flexible feature to the seat back 66. Under this arrangement, the seat back 66 is supported in a default, upright position. However, an operator can apply a manual force to temporarily tilt the seat back 66. When the operator applied tilting force is relieved, the flexible nature of the seat back tilt arrangement returns the seat back 66 to its default upright position.

Other seat back tilt and repositioning arrangements, or fixed seat arrangements may alternatively be implemented. Further, the operator's seat 56 may be located in other suitable positions. For standup trucks, the operator's station may be defined within the operator's compartment 20, for example, at a position where a backrest, knee pad, foot placement area or other provided support structure or location where an operator assumes a normal vehicle operating position while operating the vehicle. For standup trucks, the work operative controls 58 are typically provided in close proximity to the operator's standing or leaning position.

As noted above, when an operator is seated (in the case of sit down trucks) or standing or leaning against a provided support structure (in the case of stand up trucks) and is in the normal vehicle operating position at the normal vehicle operating station, one or more work operative controls 58 are provided within reach of the operator. For example, as shown, an armrest 68 is provided adjacent to and within arm's reach of the operator's seat 56. The armrest 68 supports one or more work operative controls 58 thereon. For example, a plurality of control elements including finger buttons, switches, levers, handles, knobs and other devices may be combined into a control area of the armrest 68.

A steering tiller 82 is also provided within the operator's compartment 20 for controlling the direction of travel of the vehicle 10. The steering tiller 82 is coupled to a steer column 84 that extends from a first control area, e.g., adjacent to the first longitudinal sidewall 30 of the vehicle 10. The steer column 84 may optionally be capable of tilting or otherwise repositioning to ensure a comfortable position for an operator. However, other steering arrangements may alternatively be implemented.

Additionally, one or more presence-sensing detectors 86 may be provided about the operator's compartment 20. As shown, a first presence-sensing detector 86 is implemented as a left foot presence device that is positioned about the floor of the operator's compartment 20 so as to generally lie under an operator's left foot, for example, when the operator's seat 56 is in a default position and the operator is in a work operative position seated in the operator's seat 56. The presence-sensing detector 86 may be integrated with other vehicle electronics to limit, restrict, modify or otherwise enable certain vehicle 10 work operations, depending upon whether the presence pedal detects a foot of the vehicle 10 operator.

One or more control pedals may be positioned adjacent to the presence sensing detector 86. For example, the control pedals may include a brake pedal 88, which is positioned adjacent to the presence-sensing detector 86, and an acceleration pedal 89 positioned adjacent to the brake pedal 88. In the illustrated configuration, the brake pedal 88 and the acceleration pedal 89 may be operated by the right foot of the operator. Other devices may also be positioned individually, or combined in one or more control areas on the armrest 68 or otherwise proximate to the operator's seat 56, e.g., on a work area 90 within the operator's compartment 20, including for example, levers, switches, jog wheels, throttles, twist grips, potentiometers, encoders, displays, communications devices, wireless scanning or detecting technologies and other controls.

Figure 4:
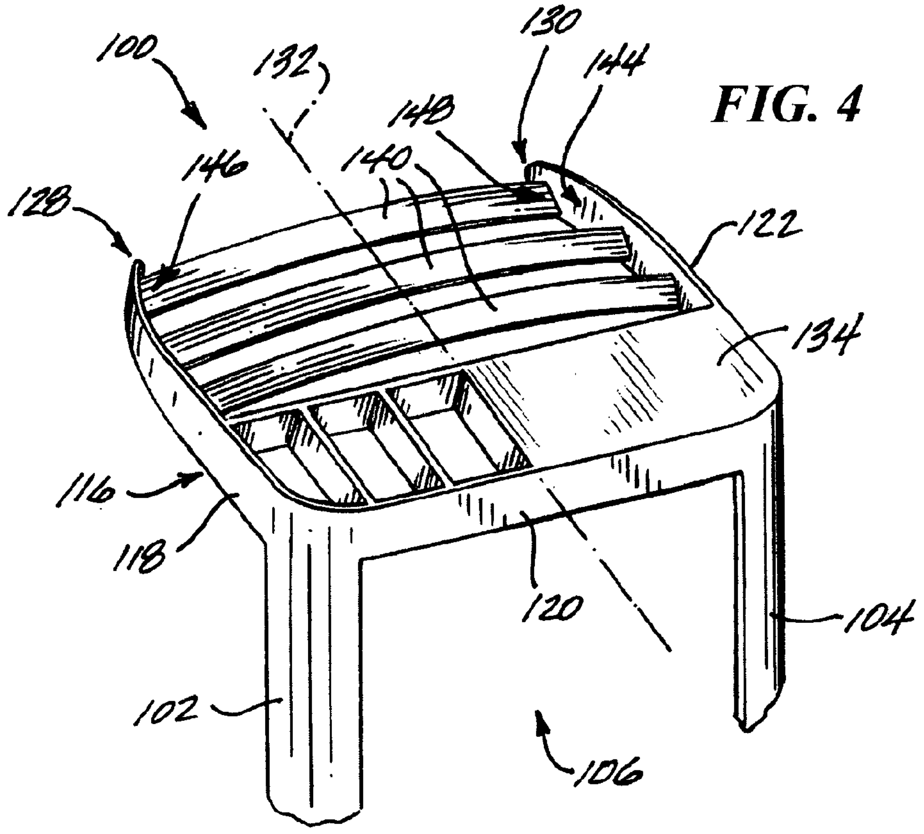
FIG. 4 is a perspective view of an overhead guard for the materials handling vehicle of FIG. 1.

With reference to FIG. 4, an overhead guard 100 extends generally over at least a portion of the operator's compartment 20. The overhead guard 100 comprises a guard frame rigidly coupled to a support structure of a materials handling vehicle 10 so as to extend generally over at least a portion of the operator's compartment 20, where the guard frame is oriented at an angle at least in an area of the overhead guard 100 situated forward of a normal vehicle operating position towards a load handling assembly 12 of the vehicle 10. The angle of the guard frame has a magnitude that is at least five degrees relative to horizontal directed upward towards the load handling assembly 12. For example, as shown, the guard frame extends from an uppermost position (highest position) proximate to the load handling assembly, which is towards the first end section 14 of the vehicle 10, and extends at an angle downward towards the normal operating position of the vehicle, e.g., the operator's seat 56, and is rigidly coupled to support structures implemented as a first support post 102 and a second support post 104 proximate to the second end section 18 of said vehicle 10.

Figure 10:
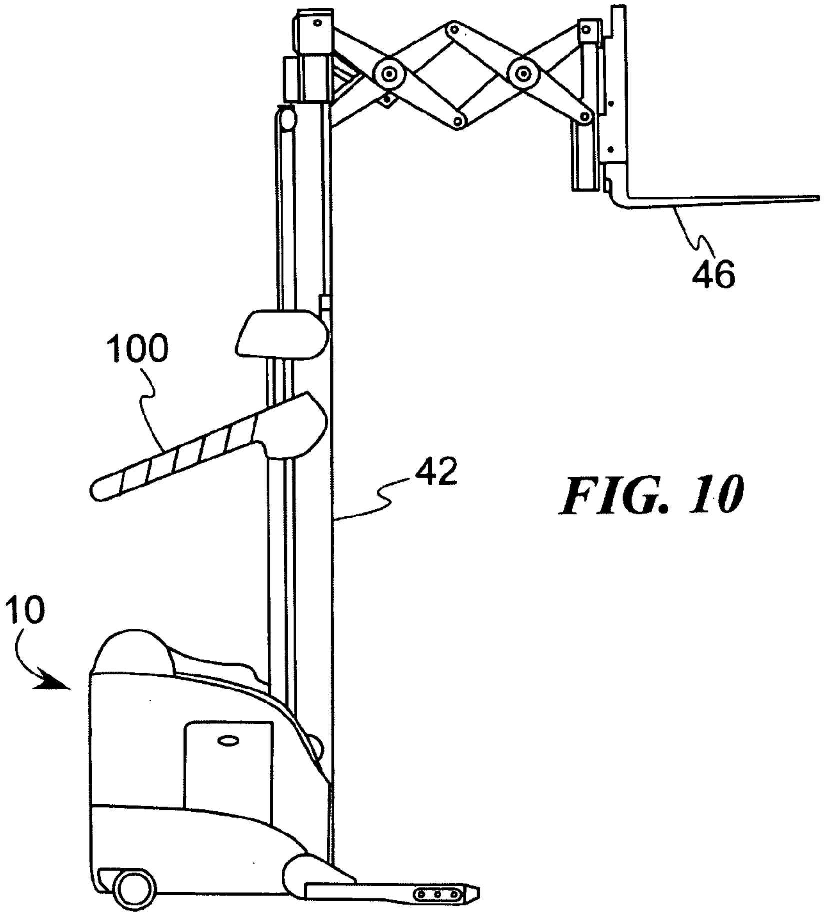
FIG. 10 is an illustration of an alternate overhead guard arrangement where the overhead guard is mounted to a mast of the vehicle.
Figure 11:
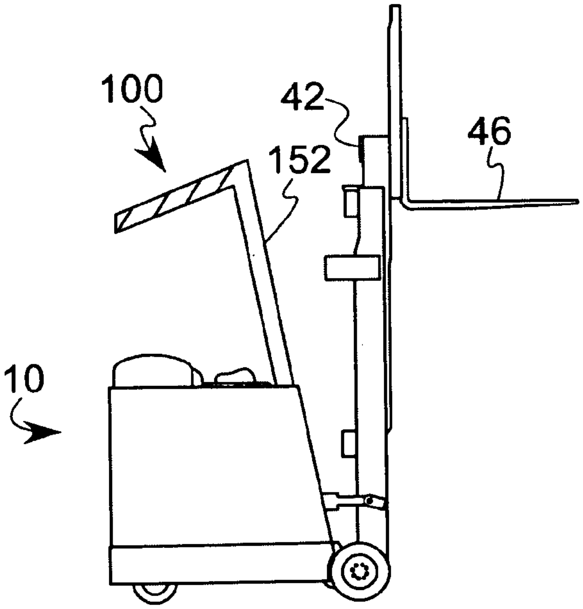
FIG. 11 is an illustration of yet another alternate overhead guard arrangement where the overhead guard is mounted to posts coupled to a chassis towards the load handling assembly of the vehicle.

Although the vehicle 10 is illustrated as having a first support post 102 and a second support post 104 extending from the chassis 28 of the vehicle proximate to the second lateral sidewall 36, the overhead guard 100 may be coupled to the vehicle 10 by any suitable support structure, including the mast 42 (e.g., as shown in FIG. 10), in combination with, or in lieu of, one or more support posts. Moreover, each provided support post 102, 104 may be coupled to the chassis 28 towards the first end section 14 (e.g., as shown in FIG. 11) or at any suitable location, such as from an associated one of the first and second longitudinal sidewalls 30, 32, or the first and second lateral sidewalls 34, 36. Additional exemplary means for coupling the overhead guard 100 to the vehicle 10 will be described in greater detail below.

In the illustrated exemplary vehicle 10 (see for example, FIGS. 1-3), the operator's seat 56 is normally side facing. That is, the seat back 66 of the operator's seat 56 is positioned generally adjacent to the second longitudinal sidewall 32, and the operator's seat 56 faces generally towards the first longitudinal sidewall 30. As such, the first support post 102 is generally forward of the operator's seat 56, and is thus also referred to herein as a forward support post 102. Similarly, in the illustrated vehicle 10, the second support post 104 is positioned generally behind the operator's seat 56. Thus, the second support post 104 is also referred to herein as a rearward support post 104.

Figure 5:
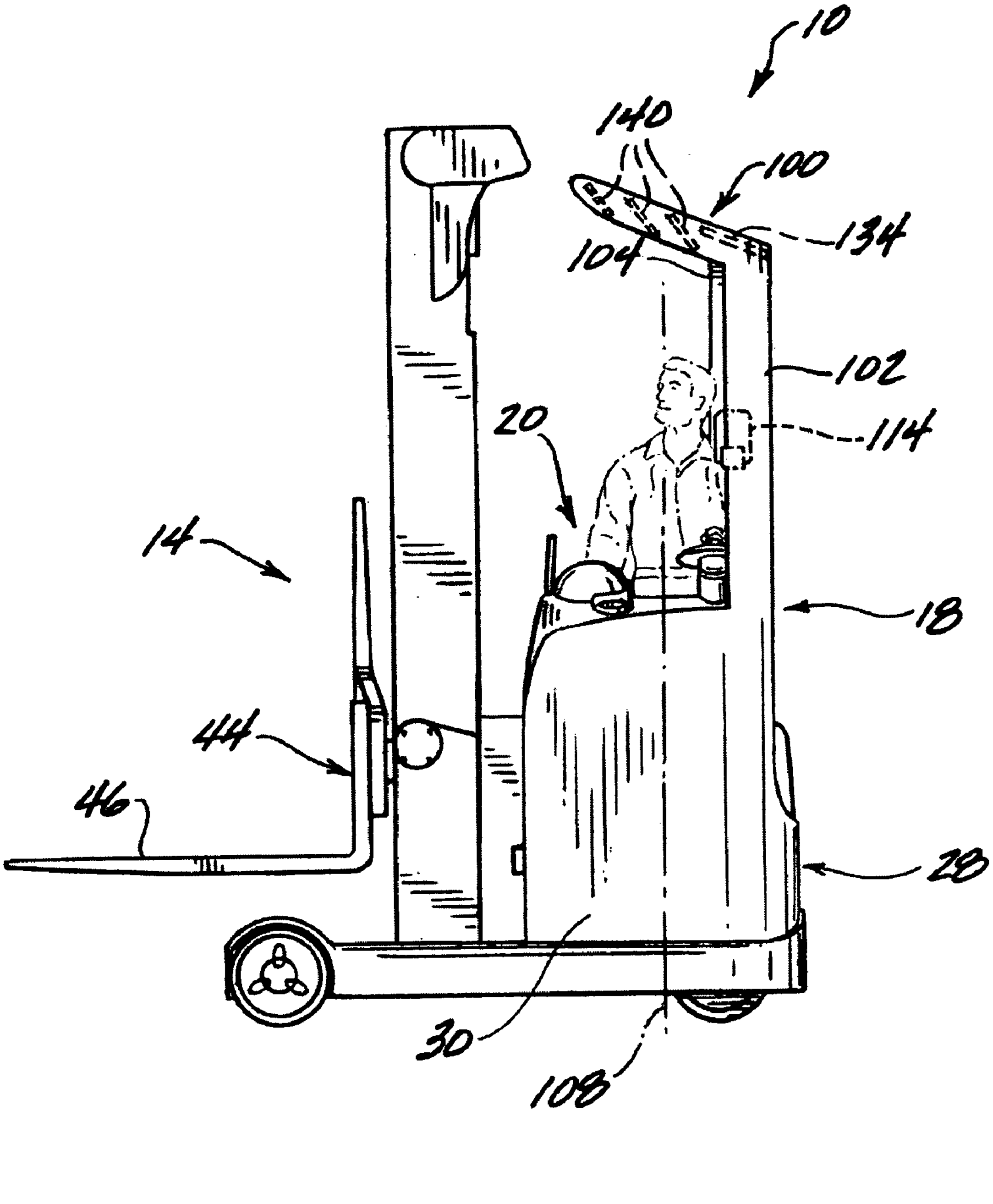
FIG. 5 is a side view of an exemplary materials handling vehicle.

With reference to FIG. 5, an operator of the vehicle 10 will normally be facing the first longitudinal sidewall 30 when seated in the operator's seat 56 if the seat 56 is maintained in its default forward facing position and the operator is looking straight ahead. To provide improved operator forward facing visibility, the forward support post 102 is longitudinally spaced from a hypothetical line of sight 108 drawn across the vehicle 10 from the position of the operator's seat 56, i.e., a distance to either side of the line of sight 108. For example, as illustrated, the forward support post 102 is positioned towards the corner edge of the first longitudinal sidewall 30 and the second lateral sidewall 36 of the operator's compartment 20.

With reference to FIGS. 1 and 5, the positioning of the forward support post 102 in the corner of the operator's compartment 20 provides a convenient grasping post so that as the operator steps up into the vehicle 10, a suitable structure is available should the operator desire a hand hold. This positioning of the forward support post 102 in combination with the location of the operator's seat 56 as described above reduces the distraction and interference of the forward support post 102 from the direct line of sight 108 of an operator sitting in the operator's seat 56 in its nominal position, e.g., when the operator faces forward towards the first longitudinal sidewall 30. Depending upon factors such as the strength requirements of the overhead guard 100, it may be necessary to provide one or more additional support posts in addition to the forward support post 102 and the rearward support post 104.

The support posts 102, 104 may be utilized to support features, accessories and add-ons of the vehicle 10. For example as shown in FIG. 5, the forward support post 102 is utilized to support an accessory 114 that may be used to assist the operator in performing work tasks. The accessory may include, for example, a radio frequency (RF) scanner, receiver, clipboard, light, fan, radio, display and/or other accessories 114, which may be mounted to the forward support post 102, e.g., using a suitable mounting bracket.

The rearward support post 104 is shown in the corner of the second longitudinal sidewall 32 and the second lateral sidewall 36. Alternatively, the rearward support post 104 may be set inward of the corner edge of the chassis 28, e.g., positioned generally behind the operator's seat 56 or in other suitable locations that may allow a seated operator to have clear visibility, which is unobstructed by the rearward support post 104 when looking towards the forks 46, towards the first end section 14 of the vehicle 10 or towards the second end section 18 of the vehicle 10. Thus, the rearward support post 104 may not significantly interfere with the visibility of the operator, for example, when driving the vehicle 10 with the power unit 16 leading or when driving the vehicle 10 having the forks 46 leading.

Figure 6:
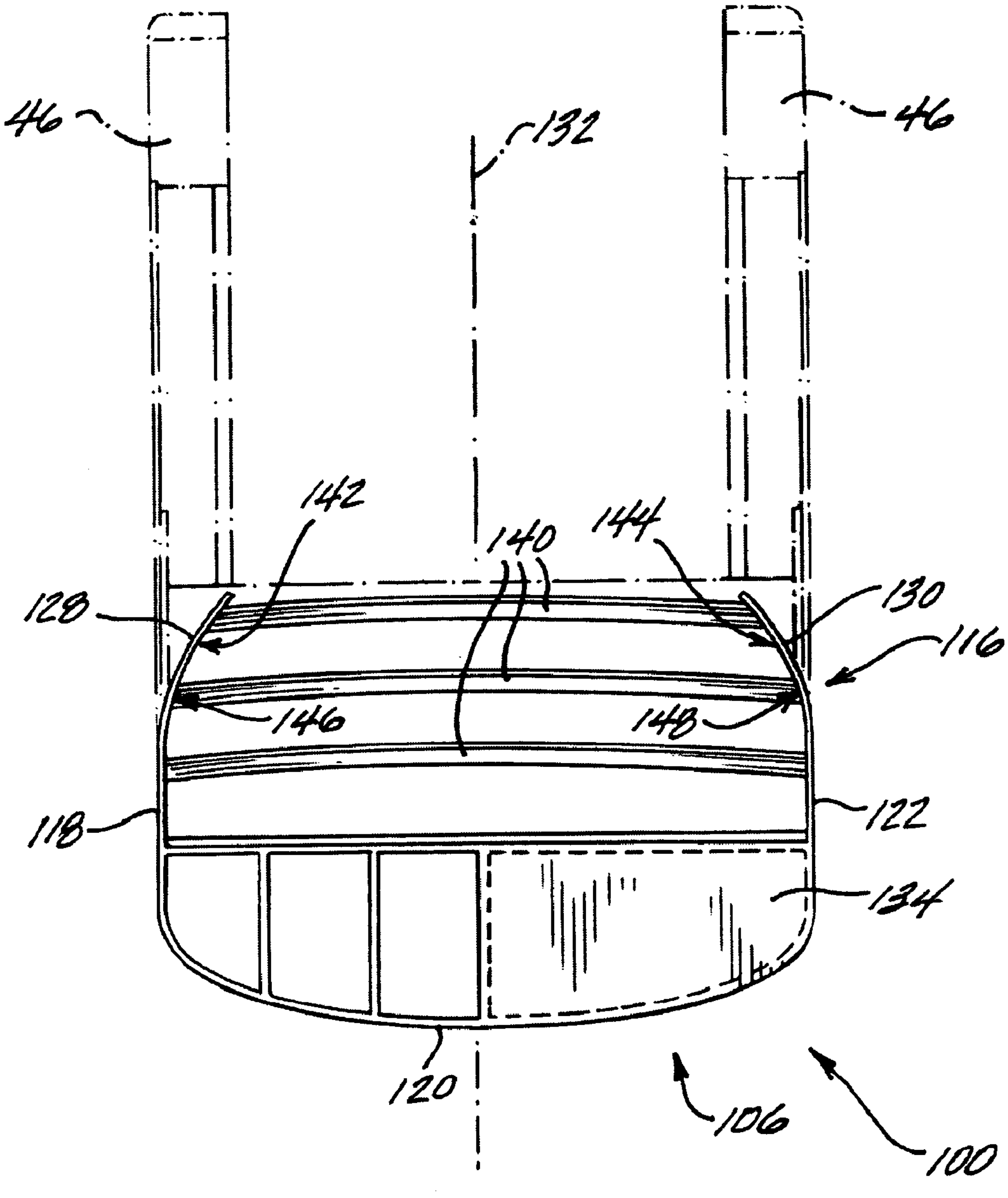
FIG. 6 is a top view looking down on the materials handling vehicle of FIG. 1.

With reference generally to FIGS. 4, 6 and 7, the angled guard 106 comprises a generally "U" shaped guard frame 116 that includes a first frame member 118, a second frame member 120 and a third frame member 122. The first, second and third frame members 118, 120, 122 may comprise independent structures that are bonded, fastened, welded, joined or otherwise coupled together. Alternatively, two or more of the first, second and third frame members 118, 120, 122 may be derived from a common source structure, e.g., by bending or otherwise deforming a structure to conform to the desired geometry of the guard frame 116.

In the exemplary guard 100, the first frame member 118 extends generally in the longitudinal direction. As such, the first frame member 118 is also referred to herein as a first longitudinal frame member 118. The second frame member 120 extends generally in the lateral direction. As such, the second frame member 120 is also referred to herein as a lateral frame member 120. The third frame member 122 extends in the longitudinal direction. As such, the third frame member 122 is also referred to herein as a second longitudinal frame member 122.

When the overhead guard 100 is suitably mounted over the chassis 28 of the power unit 16, at least a portion of the overhead guard frame 116 is oriented at an angle having a magnitude that is at least five degrees relative to the horizontal, and is angled upward and towards the load handling assembly 12 of the vehicle 10, e.g., towards the upper portion of the mast 42 or forks 46 (when in a raised position). The angled portion of the guard extends at least in an area of the overhead guard 100 situated between the operator's seat 56 and the load handling assembly 12 of the vehicle 10. For example, as illustrated, first and second longitudinal frame members 118, 122 angle upward in a plane towards an upper section of the mast 42 at an angle A (see for example, FIG. 8). The angle A may vary depending upon a number of factors such as the visibility requirements of a particular vehicle, the height of the mast 42, etc. Thus, in practice, the angle A will typically be at least 5 degrees, but may be as much as 15-30 degrees or more.

Moreover, the first longitudinal frame member 118 has a first end section 128 opposite of the lateral frame member 120 that tapers and curves generally inward towards a centerline 132 of the vehicle 10. Similarly, the second longitudinal frame member 122 has a first end section 130 opposite of the lateral frame member 120 that also tapers and curves generally inward towards the centerline 132 of the vehicle 10. The taper and inward curve on the first end sections 128, 130 of the first and second longitudinal frame members 118, 122 is provided for example, to prevent the overhead guard 100 from snagging, catching or otherwise engaging unintended structures, or from giving the appearance that the overhead guard 100 can snag, catch or otherwise engage unintended structures. The angled and tapered features of the first and second longitudinal frame members 118, 122 also give the overhead guard 100 the appearance of a shorter overall length when viewed from certain angles, especially by a seated operator.

The guard member(s) may be defined by a plate 134 or other suitable structure capable of providing a barrier across or otherwise between the frame members 118, 120, 122. For example, as illustrated in the figures generally, the plate 134 spans between the first and second longitudinal frame members 118, 122, and extends longitudinally from the lateral frame member 120 towards the first end section 14 of the vehicle 10. Moreover, the plate 134 is oriented generally over the operator's seat 56 and is positioned generally adjacent to the lateral frame member 120. The plate 134 may alternatively have a different size, shape, position and/or orientation, depending upon the application. The plate 134 may incorporate or otherwise be provided in addition to slots or other openings that allow visibility through the overhead guard 100. For example, the plate 134 may include a plurality of apertures therethrough. The plate 134 may also be located adjacent to slots or other openings as shown.

With specific reference to FIG. 7, which shows the underside of the overhead guard 100, a support bar 138 may optionally span between the first and second longitudinal frame members 118, 122, e.g., along the edge of the plate 134 opposite of the lateral frame member 120 to provide additional support and/or rigidity to the plate 134, slots and other features if provided. The dimensions of the support bar 138 may be determined such that the support bar 138 will not interfere with the visibility of the operator seated in the operator's seat 56 and looking up, e.g., generally towards the forks 46 when the forks 46 are in a hoisted position.

With reference back to FIGS. 4, 6 and 7, one or more guard members may also be implemented as guard bars 140 in addition to, or in lieu of the plate 134. The guard bar(s) 140 are supported by the guard frame 116 and may span or otherwise extend in the area defined by the first, second and third frame members 118, 120, 122. For example, the guard bars 140 may extend in the longitudinal direction, in the lateral direction, or at an angle. Moreover, the guard bars 140 may be generally straight or arcuate as will be described in greater detail below.

As shown, there are three guard bars 140. However any number of guard bars 140 may be utilized, depending for example, upon the length of the first and second longitudinal frame members 118, 122 and the required or desired spacing and/or orientation between adjacent guard bars 140.

According to one aspect of the present invention, each guard bar 140 is positioned between the first and second longitudinal frame members 118, 122 and is oriented at an angle relative to the first and second longitudinal frame members 118, 122. The particular angle may be selected to maximize the visibility of an operator seated in the operator's seat 56, who may be looking upward through, under or around the overhead guard 100. It is likely that different operators of the vehicle 10 will have different physical attributes and that a given angle that is optimal for one operator may not be optimal for another operator. Thus, the selected angle may be based on an arbitrary anticipated operator. For example, the angle may be based upon a $50^{th}$ percentile size of anticipated operators.

The first and second longitudinal frame members 118, 122 each have an inside major surface 142, 144 to which the plurality of guard bars 140 may be attached. Each guard member 140 further comprises a first end 146 and a second end 148. With reference to FIG. 8, which illustrates a cross section through the overhead guard 100 along the centerline 132, the plurality of guard bars 140 are positioned such that each of their respective ends 146, 148 are positioned at an angle relative to the corresponding inside major surface 142, 144 of the first and second longitudinal frame members 118, 122, respectively, as illustrated in FIG. 8 by the angles α, β and γ. The angles α, β and γ may be unique, or each may be the same.

Moreover, the guard bars 140 may be arcuate as seen, for example, in FIGS. 1 and 4. The curvature of the guard bars 140 relative to the lateral direction, if provided, may be the same for each guard bar 140, or each guard bar 140 may have a unique radius of curvature defining its arc. The amount of curvature of each guard member 140 may vary depending upon a number of factors. The arc of the guard bars 140 may be determined based upon the position of the operator's seat 56, the anticipated size of an arbitrary operator, e.g., a $50^{th}$ percentile anticipated operator, the distance of the anticipated operator from the guard member 140 and other like factors taken alone or in combination.

The arcuate shape of the guard bars 140 allows improved visibility through the overhead guard 100 regardless of whether the focus of the vision of the operator is through the middle portion of the guard 100, e.g., along the centerline 132, to the forward side of the guard 100 or to the rearward side of the guard 100. Also, while shown as being arcuate in shape, the guard bars 140 may also be straight bars or other shapes, including shapes having varying cross sectional area.

With reference to FIG. 5, to view the forks 46, the operator (shown in phantom), turns his or her head to the side. As the forks 46 are raised, the operator's gaze is directed upward. The angled overhead guard 100 provides visibility to the top of the mast 42 and vertically beyond by providing visibility through the overhead guard 100.

Figure 9:
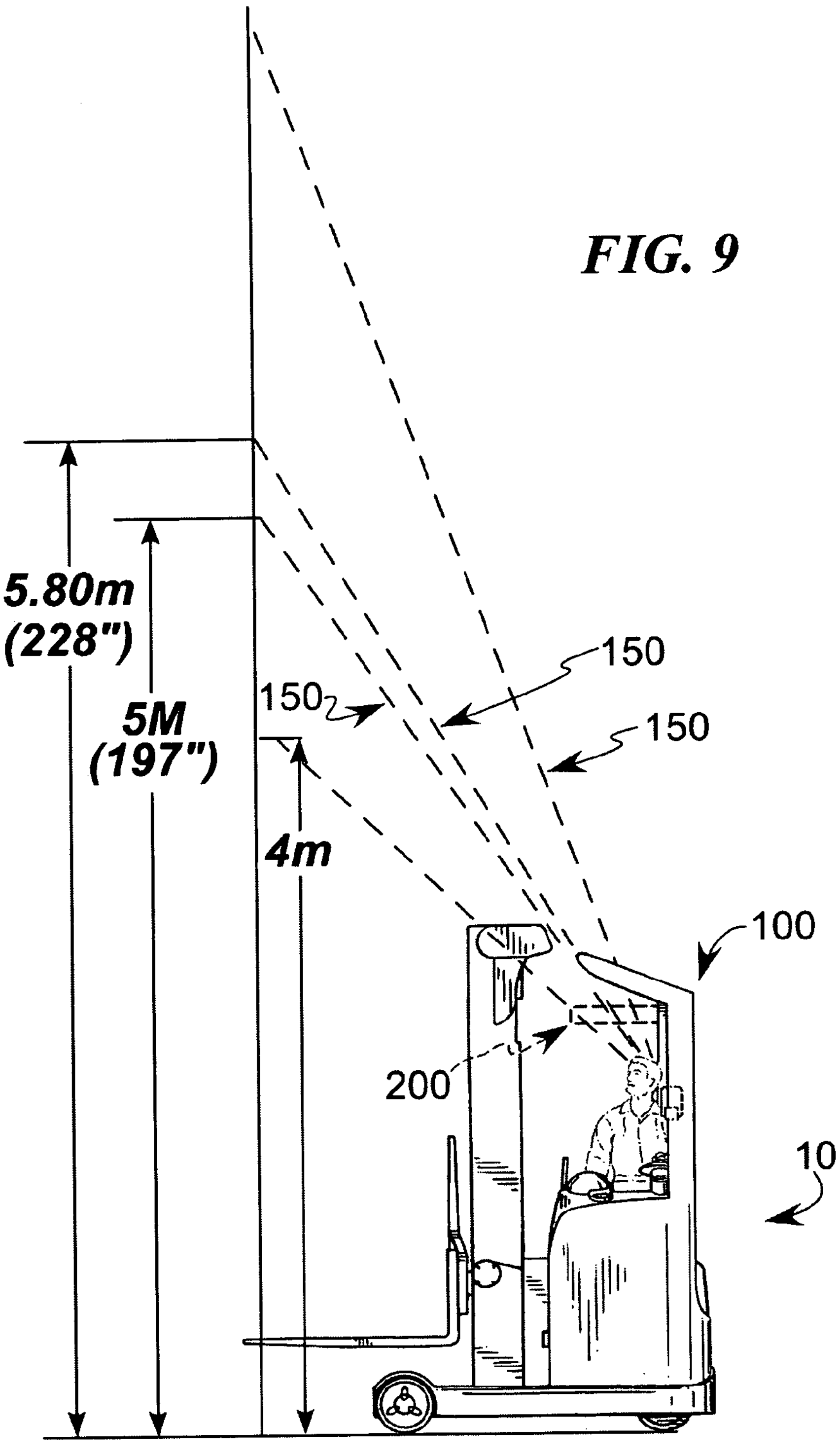
FIG. 9 is a schematic representation of the lines of sight enabled by the overhead guard according to various aspects of the present invention.

The guard bars 140 are each positioned between the first and second longitudinal frame members 118, 122 and are oriented at an angle as schematically represented in FIG. 8 so as to achieve a desired line of sight range indicated generally by the reference numeral 150 in FIG. 9. The angle of each guard member 140 is selected to maximize visibility from the perspective of a $50^{th}$ percentile operator seated in the operator's seat 56. Other reference points may alternatively be used.

By providing the first and second longitudinal frame members 118, 122 at a nonzero angle relative to horizontal, the guard bars 140 may be physically further away from an operator seated in the operator's seat 56. Thus, the guard bars 140 will be perceived by the operator as being smaller than they would be perceived if the first and second longitudinal frame members 118,122 were horizontally oriented. Also, the angle of each guard bar 140 reduces the operator perceived height (vertical dimension) of the guard bars 140. Accordingly, the guard bars 140 are less distracting to the operator compared to lateral bars in a conventional horizontal guard.

As one example, for a given vehicle 10, a conventional horizontal overhead guard, represented by a dashed line 200 in FIG. 9, may result in a visibility that is unobstructed by the overhead guard of approximately 4 meters or less. However, the angled overhead guard 100 allows a visibility unobstructed by the overhead guard 100 of over 5 meters.

By angling the first and second longitudinal frame members 118, 122 relative to horizontal, at least in the area of the overhead guard 100 situated between the normal vehicle operating position, e.g., the seat, and the load handling assembly, the spacing between the guard bars 140 along the first and second longitudinal frame members 118, 122 can be increased while retaining a predetermined horizontal spacing between the guard bars 140 as is apparent from simple geometry, e.g., by knowing the designed for horizontal spacing and the angle A of the guard frame 106 relative to the horizontal. For example, it may be desirable to realize a spacing of less than approximately 6 inches (150 millimeters) measured across the horizontal between adjacent guard bars 140. Moreover, the angle of the first and second longitudinal frame members 118, 122 may comprise an angle having a magnitude greater than zero degrees relative to the horizontal. Thus, simple geometry can be used to compute a corresponding spacing of the guard bars 140 along the first and second longitudinal frame members 118, 122 to achieve the desired corresponding horizontal spacing.

Moreover, orienting the first and second longitudinal frame members 118, 122 upward towards the load handling assembly 12, at least in an area of the overhead guard 100 situated between the operator's seat 56 and the load handling assembly 12 of the vehicle 10 further improves visibility when looking at an angle up through the guard bars 140, such as when seated in the operator's seat 56. As such, an operator seated in the operator's seat 56 has a perception of better visibility because the angled overhead guard 100 improves the maximum unobstructed line of sight below the guard 100 and improves visibility through the guard 100.

With reference to FIG. 10, another exemplary overhead guard configuration is provided to illustrate an arrangement wherein the angled overhead guard is attached to the mast 42 instead of the chassis 28. Depending upon the specific implementation, it may further be desirable to also attach the overhead guard to support posts, e.g., as described in greater detail above.

With reference to FIG. 11, yet another exemplary configuration illustrates an arrangement wherein the support posts are positioned towards the first lateral sidewall 34 of the operator's compartment 20. For example, support posts may be provided in each of the corners of the first lateral sidewall. As shown, the support posts 152 angle relative to the vertical to compensate for a mast 42 that is capable of tilting. The angled overhead guard 100 may also be utilized on vehicles having a retractable guard, e.g., to accommodate vehicles that must enter truck trailers, containers, and fit through low doors.

As used herein, the term "coupled" means to link or otherwise join or connect in either a permanent or temporary manner, and includes direct coupling, e.g., integral forming of components, a direct physical interconnection or a connection that includes one or more intermediate components, structures, elements, etc. As used herein, the term "between" should be interpreted expansively to include relationships describing relative position that are associated spatially, but not necessarily linearly, along a definable path.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. An overhead guard comprising:

a guard frame having first and second longitudinal frame members and at least one lateral frame member that rigidly couples said first and second longitudinal frame members, said guard frame fixedly and rigidly coupled to a support structure of a materials handling vehicle so as to extend generally over at least a portion of an operator's compartment of said vehicle, said guard frame oriented at an angle at least in an area of said overhead guard situated forward of a normal vehicle operating position towards a load handling assembly of said vehicle, said angle having a magnitude that is at least five degrees relative to horizontal directed upward towards said load handling assembly; and at least one guard member that is supported by said guard frame at least within an area generally over said operator's compartment of said vehicle.

2. The overhead guard according to claim 1, wherein:

said at least one guard member comprises a generally elongate and arcuate member that spans between said first and second longitudinal frame members.

3. The overhead guard according to claim 2, wherein:

said first and second longitudinal frame members each comprise an inside major surface; and said at least one guard member is oriented at a unique non-zero degree angle relative to said inside major surfaces of said first and second longitudinal frame members.

4. The overhead guard according to claim 3, wherein said unique angle is defined so as to maximize a range of visibility through said overhead guard from a predetermined reference point.

5. The overhead guard according to claim 1, wherein:

a first end section of both said first and second longitudinal frame members tapers and angles inward.

6. The overhead guard according to claim 1, wherein:

said guard frame extends from an uppermost position proximate to said load handling assembly and extends at said angle downward towards said normal operating position.

7. The overhead guard according to claim 1, wherein:

said at least one guard member comprises a plate that spans between said first and second longitudinal frame members.

8. The overhead guard according to claim 1, wherein said support structure of said vehicle comprises:

at least one support post that fixedly and rigidly extends from a chassis of said vehicle to said guard frame, wherein said guard frame is fixedly and rigidly coupled to said at least one support post.

9. The overhead guard according to claim 1, wherein said support structure of said vehicle comprises a mast and said guard frame fixedly and rigidly couples to said mast.

10. A materials handling vehicle comprising:

an operator's compartment having a normal vehicle operating position, a first lateral sidewall, a first longitudinal sidewall and a second longitudinal sidewall;

a load handling assembly adjacent to said first lateral side wall of said operator's compartment comprising a mast and a pair of forks controllable to traverse up and down along at least a portion of said mast;

a first support post fixedly and rigidly extending generally upward from said first longitudinal sidewall;

a second support post fixedly and rigidly extending generally upward from said second longitudinal sidewall; and an overhead guard comprising a guard frame fixedly and rigidly coupled to said first and second support posts so as to extend generally over at least a portion of said operator's compartment of said vehicle, said guard frame oriented at an angle at least in an area of said overhead guard situated forward of a normal vehicle operating position and towards said load handling assembly of said vehicle, said angle having a magnitude that is at least five degrees relative to horizontal directed upward towards said load handling assembly; and at least one guard member that is supported by said guard frame at least within an area generally over said operator's compartment of said vehicle.

11. The materials handling vehicle according to claim 10, wherein:

said guard frame comprises first and second longitudinal frame members and at least one lateral frame member that couples said first and second longitudinal frame members and a first end section of both said first and second longitudinal frame members tapers and angles inward.

12. The materials handling vehicle according to claim 10, wherein:

said guard frame comprises first and second longitudinal frame members and at least one lateral frame member that couples said first and second longitudinal frame members;

said first and second longitudinal frame members each comprise an inside major surface; and said at least one guard member is positioned at an angle relative to said inside major surfaces of said first and second longitudinal frame members.

13. The materials handling vehicle according to claim 12, wherein:

said at least one guard member comprises a plurality of guard members, each guard member positioned at an angle so as to provide a predetermined line of sight range when viewed from a predetermined vantage point.

14. The materials handling vehicle according to claim 12, wherein said at least one guard member comprises a generally elongate and arcuate member.

15. A materials handling vehicle comprising:

an operator's compartment having a normal vehicle operating position, a first lateral sidewall, a first longitudinal sidewall and a second longitudinal sidewall;

a load handling assembly adjacent to said first lateral side wall of said operator's compartment comprising a mast and a pair of forks controllable to traverse up and down along at least a portion of said mast;

a first support post extending generally upward from said first longitudinal sidewall;

a second support post extending generally upward from said second longitudinal sidewall; and an overhead guard comprising a guard frame coupled to said first and second support posts so as to extend generally over at least a portion of said operator's compartment of said vehicle, said guard frame oriented at an angle at least in an area of said overhead guard situated forward of a normal vehicle operating position and towards said load handling assembly of said vehicle, said angle having a magnitude that is at least five degrees relative to horizontal directed upward towards said load handling assembly; and at least one guard member that is supported by said guard frame at least within an area generally over said operator's compartment of said vehicle; wherein:

said normal vehicle operating position comprises an operator's seat positioned so as to normally face generally towards said first longitudinal side wall; and said second support post is positioned generally behind said operator's seat.

16. A materials handling vehicle comprising:

an operator's compartment having a normal vehicle operating position, a first lateral sidewall, a first longitudinal sidewall and a second longitudinal sidewall;

a load handling assembly adjacent to said first lateral side wall of said operator's compartment comprising a mast and a pair of forks controllable to traverse up and down along at least a portion of said mast;

a first support post extending generally upward from said first longitudinal sidewall;

a second support post extending generally upward from said second longitudinal sidewall; and an overhead guard comprising a guard frame coupled to said first and second support posts so as to extend generally over at least a portion of said operator's compartment of said vehicle, said guard frame oriented at an angle at least in an area of said overhead guard situated forward of a normal vehicle operating position and towards said load handling assembly of said vehicle, said angle having a magnitude that is at least five degrees relative to horizontal directed upward towards said load handling assembly; and at least one guard member that is supported by said guard frame at least within an area generally over said operator's compartment of said vehicle wherein:

said normal vehicle operating position comprises an operator's seat positioned so as to normally face generally towards said first longitudinal sidewall; and said first support post is positioned along said first longitudinal wall at a position that is offset from alignment directly in front of said operator's seat when said operator's seat is in its normal facing position.

17. A materials handling vehicle comprising:

an operator's compartment having a normal vehicle operating position, a first lateral sidewall, a first longitudinal sidewall and a second longitudinal sidewall;

a load handling assembly adjacent to said first lateral side wall of said operator's compartment comprising a mast and a pair of forks controllable to traverse up and down along at least a portion of said mast;

a first support post extending generally upward from said first longitudinal sidewall;

a second support post extending generally upward from said second longitudinal sidewall; and an overhead guard comprising a guard frame coupled to said first and second support posts so as to extend generally over at least a portion of said operator's compartment of said vehicle, said guard frame oriented at an angle at least in an area of said overhead guard situated forward of a normal vehicle operating position and towards said load handling assembly of said vehicle said angle having a magnitude that is at least five degrees relative to horizontal directed upward towards said load handling assembly; and at least one guard member that is supported by said guard frame at least within an area generally over said operator's compartment of said vehicle, wherein:

said guard frame comprises first and second longitudinal frame members and at least one lateral frame member that couples said first and second longitudinal frame members;

said first and second longitudinal frame members each comprise an inside major surface;

said at least one guard member is positioned at an angle relative to said inside major surfaces of said first and second longitudinal frame members;

said normal vehicle operating position comprises an operator's seat positioned so as to normally face generally towards said first longitudinal sidewall; and said overhead guard further comprises a plate that spans between said first and second longitudinal frame members generally over said operator's seat.

18. An overhead guard comprising:

a guard frame having first and second longitudinal frame members and at least one lateral frame member that rigidly couples said first and second longitudinal frame members;

said guard frame fixedly and rigidly coupled to a support structure of a materials handling vehicle so as to extend generally over at least a portion of an operator's compartment of said vehicle, said first and second longitudinal frame members oriented at an angle at least in an area of said overhead guard situated forward of a normal vehicle operating position towards a load handling assembly of said vehicle, said angle having a magnitude that is at least five degrees relative to horizontal directed upward towards said load handling assembly; and a plurality of guard bars that span between said first and second longitudinal frame members, wherein a distance between each of said guard members is selected based upon said angle of said first and second frame members so that a horizontal distance between adjacent guard members does not exceed six inches.

19. The overhead guard according to claim 18, wherein support structure defines at least one of a mast or a support post extending between a chassis of said vehicle and said overhead guard frame.

20. The overhead guard according to claim 18, further comprising a plate extending between said first and second longitudinal frame members.

* * * * *

UNITED STATES PATENT AND TRADEMARK OFFICE

CERTIFICATE OF CORRECTION

PATENT NO. : 7,306,280 B1
APPLICATION NO. : 11/478388
DATED : December 11, 2007
INVENTOR(S) : James V. Kraimer It is certified that error appears in the above-identified patent and that said Letters Patent is hereby corrected as shown below:

Col. 10, line 7, “guard frame 106” should read --guard frame 116--.

Col. 12, line 17, “an overhead guard comprising” should read --an overhead guard comprising:--;

Col. 13, line 5, “an overhead guard comprising” should read --an overhead guard comprising:--;

Col. 13, line 36, “an overhead guard comprising” should read --an overhead guard comprising:--;

Col. 14, line 5, “an overhead guard comprising” should read --an overhead guard comprising:--;

Col. 14, line 12, “assembly of said vehicle said angle” should read --assembly of said vehicle, said angle--.

Signed and Sealed this

Twenty-second Day of July, 2008

JON W. DUDAS
*Director of the United States Patent and Trademark Office*